United States Patent
Miyoshi et al.

(10) Patent No.: US 8,302,378 B2
(45) Date of Patent: Nov. 6, 2012

(54) DEGRADATION DIAGNOSIS DEVICE FOR CATALYST

(75) Inventors: Yuji Miyoshi, Susono (JP); Daisuke Shibata, Numazu (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 384 days.

(21) Appl. No.: 12/521,710

(22) PCT Filed: Jun. 4, 2008

(86) PCT No.: PCT/JP2008/060627
§ 371 (c)(1),
(2), (4) Date: Jun. 29, 2009

(87) PCT Pub. No.: WO2008/150014
PCT Pub. Date: Dec. 11, 2008

(65) Prior Publication Data
US 2010/0319318 A1    Dec. 23, 2010

(30) Foreign Application Priority Data
Jun. 5, 2007 (JP) .................... 2007-149662

(51) Int. Cl.
*F01N 11/00* (2006.01)
(52) U.S. Cl. ............. 60/277; 60/286; 60/295; 60/300
(58) Field of Classification Search .............. 60/277, 60/286, 295, 300
See application file for complete search history.

(56) References Cited

U.S. PATENT DOCUMENTS

| | | | | |
|---|---|---|---|---|
| 5,600,948 A | * | 2/1997 | Nakajima et al. | 60/276 |
| 6,178,743 B1 | * | 1/2001 | Hirota et al. | 60/277 |
| 7,322,182 B2 | * | 1/2008 | Ueno et al. | 60/295 |
| 2004/0128983 A1 | * | 7/2004 | Okada et al. | 60/277 |
| 2004/0187477 A1 | * | 9/2004 | Okugawa et al. | 60/277 |
| 2005/0126161 A1 | * | 6/2005 | Otake et al. | 60/277 |
| 2006/0089783 A1 | * | 4/2006 | Braun | 701/114 |
| 2006/0101808 A1 | * | 5/2006 | Nakagawa et al. | 60/277 |
| 2006/0123768 A1 | * | 6/2006 | Miura | 60/277 |
| 2006/0242945 A1 | * | 11/2006 | Wang et al. | 60/277 |

FOREIGN PATENT DOCUMENTS

| | | |
|---|---|---|
| EP | 1 555 401 A1 | 7/2005 |
| JP | 04-060106 A | 2/1992 |
| JP | 06-264724 A | 9/1994 |
| JP | 07-180536 A | 7/1995 |
| JP | 11-315713 A | 11/1999 |
| JP | 2005-201119 A | 7/2005 |

* cited by examiner

*Primary Examiner* — Thomas Denion
*Assistant Examiner* — Jorge Leon, Jr.
(74) *Attorney, Agent, or Firm* — Sughrue Mion, PLLC

(57) ABSTRACT

A temperature increasing degree of the catalytic outflow exhaust temperature at the time the exhaust air-fuel ratio is changed to the rich side is found in respect to each of a plurality of the catalytic inflow exhaust temperatures. A grade (S) of the temperature increasing degree is found based upon the inflow exhaust temperature and the temperature increasing degree to determine degradation of the catalyst based upon at least one of a maximum value (Smax) of the grade and the inflow exhaust temperature (Tinmax) corresponding to the maximum value. An accurate catalyst degradation diagnosis can be carried out since not only the temperature increasing degree but also the inflow exhaust temperature are taken into account.

14 Claims, 9 Drawing Sheets

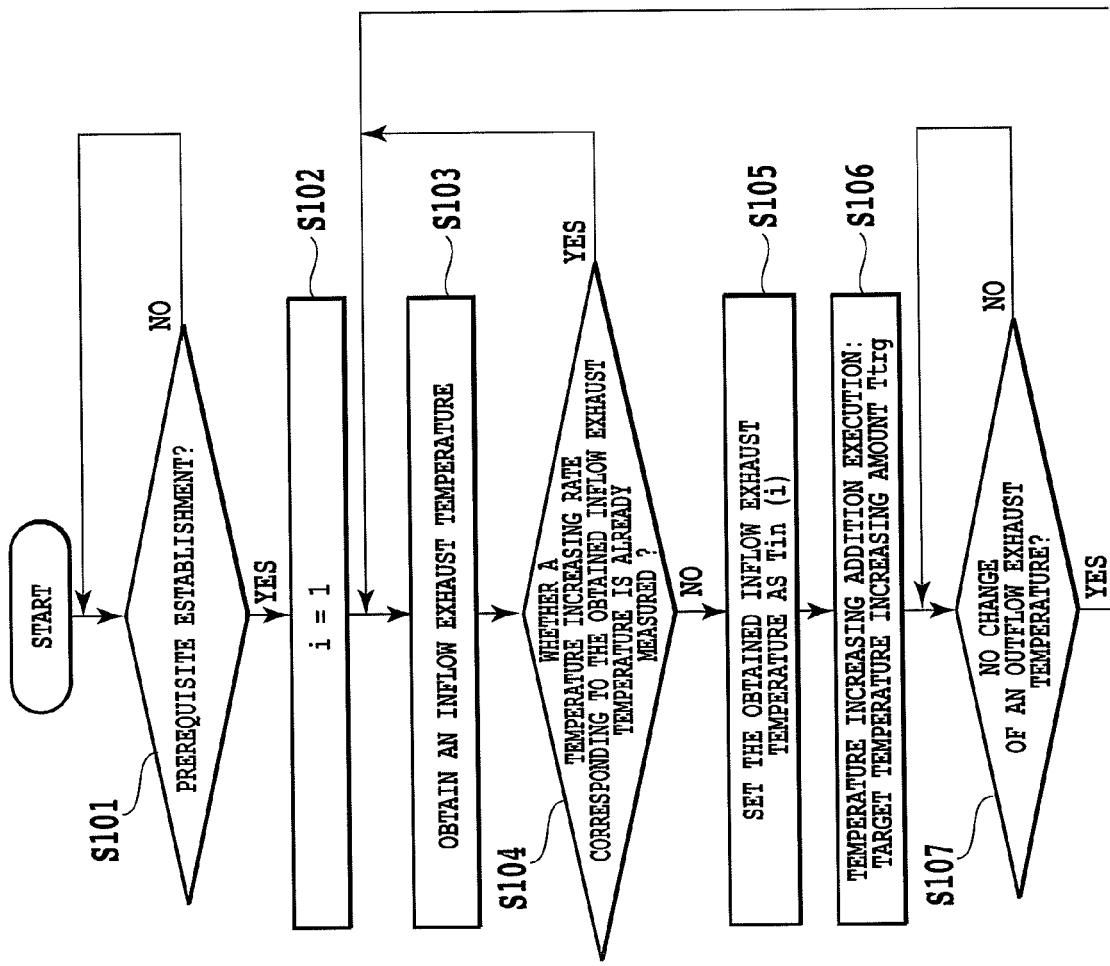

DEGRADATION DIAGNOSIS DEVICE FOR CATALYST

TECHNICAL FIELD

The present invention relates to a device for degradation diagnosis of a catalyst located in an exhaust passage of an internal combustion engine.

BACKGROUND ART

In general, a catalyst for purifying an exhaust gas is provided in an exhaust passage of an internal combustion engine. When the catalyst is degraded, more harmful substances are emitted into an atmosphere and therefore, for preventing this issue, the degradation of the catalyst is diagnosed. Particularly, in a case of an engine mounted in an automobile, there is also a demand for diagnosing degradation of a catalyst on board from regulations in various countries.

For example, Japanese Patent Application Laid-Open No. H04-060106 (1992) discloses a device in which a temperature increasing grade is calculated based upon a catalyst temperature detected at a steady operating time of an engine and a catalyst temperature detected after an air-fuel ratio is corrected to a rich side at a steady operating time, and it is determined that the catalyst is degraded when the temperature increasing grade is not within an allowable range. In addition, Japanese Patent Application Laid-Open No. H07-180536 (1995) discloses that in a device for diagnosing degradation of a catalyst based upon an output value of a temperature sensor for detecting a temperature in an inlet of the catalyst or in the vicinity thereof and an output value of a temperature sensor for detecting a temperature in an inside or an outlet of the catalyst, the output value of the one temperature sensor is corrected in accordance with an output difference at a predetermined timing between outputs of both the temperature sensors.

The technology described in Japanese Patent Application Laid-Open No. H04-060106 (1992) is as follows. That is, when the air-fuel ratio is corrected to the rich side, a reaction heat of the catalyst increases to increase a temperature of the catalyst. Further, the temperature increasing grade of the catalyst at this time changes with a degradation degree of the catalyst. Accordingly, the degradation of the catalyst is intended to be determined by taking advantage of this characteristic.

However, the temperature increasing degree of the catalyst at the time the air-fuel ratio is changed to the rich side changes not only with the degradation degree but also with a temperature of the exhaust gas flowing into the catalyst. Therefore, without considering this, an accurate catalyst degradation diagnosis cannot be carried out.

Accordingly, the present invention is made in view of the foregoing problems and an object of the present invention is to provide a degradation diagnosis device for a catalyst which can carry out an accurate diagnosis

DISCLOSURE OF THE INVENTION

According to a first aspect of the present invention, there is provided a degradation diagnosis device for a catalyst which is characterized by comprising:

exhaust air-fuel ratio changing means for changing an exhaust air-fuel ratio of an internal combustion engine to a rich side;

inflow exhaust temperature detecting means for detecting or estimating an inflow exhaust temperature which is a temperature of an exhaust gas flowing into a catalyst;

outflow exhaust temperature detecting means for detecting an outflow exhaust temperature which is a temperature of an exhaust gas flowing out from the catalyst; and degradation determining means for finding a temperature increasing degree of the outflow exhaust temperature at the time the exhaust air-fuel ratio is changed to the rich side, in respect to each of a plurality of the inflow exhaust temperatures, and finding a grade of the temperature increasing degree based upon the inflow exhaust temperature and the temperature increasing degree to determine degradation of the catalyst based upon at least one of a maximum value of the grade and the inflow exhaust temperature corresponding to the maximum value.

The present inventors have found out, as a result of the committed studies, that there is a given relation reflecting the catalyst degradation degree between the maximum value of the grade in the temperature increasing degree and the inflow exhaust temperature corresponding to the maximum value. According to the first aspect of the present invention, since the degradation of the catalyst is determined based upon at least one of the maximum value of the grade and the inflow exhaust temperature corresponding to the maximum value of the grade, an accurate catalyst degradation diagnosis also in consideration of the inflow exhaust temperature can be carried out.

A second aspect of the present invention is characterized in that the first aspect is provided with abnormality determining means for calculating a reference value of the inflow exhaust temperature corresponding to the maximum value of the grade from a predetermined relation between the maximum value of the grade and the inflow exhaust temperature corresponding to the maximum value, and comparing the reference value with an actual detection value or an estimation value of the inflow exhaust temperature corresponding to the maximum value of the grade to determine an abnormality of the detection value or the estimation value.

Since there is a relation of one to one between the maximum value of the grade and the inflow exhaust temperature corresponding to the maximum value, the only inflow exhaust temperature is defined in respect to a grade maximum value. According to the second aspect, by taking advantage of this relation, the reference value of the inflow exhaust temperature corresponding to the maximum value of the grade is calculated, and the reference value is compared with the actual detection value or the estimation value to determine the abnormality of the detection value or the estimation value. Therefore, this prevents the degradation diagnosis using an inappropriate detection value or an inappropriate estimation value from being carried out, leading to an improvement on accuracy of the degradation diagnosis.

A third aspect of the present invention is characterized in that the second aspect is provided with correction means for correcting a detection value or an estimation value when the abnormality determining means determines that the detection value or the estimation value is abnormal, wherein the degradation determining means determines the degradation of the catalyst based upon at least one of the maximum value of the grade and the corrected detection value or estimation value of the inflow exhaust temperature corresponding to the maximum value.

According to the third aspect, after the abnormal detection value or the abnormal estimation value is corrected, the degradation of the catalyst is carried out. Therefore, an accuracy of the degradation diagnosis can be improved.

A fourth aspect of the present invention is characterized in that in any of the aspects 1 to 3, the degradation determining means determines that the catalyst is degraded at least either when the maximum value of the grade is less than a predetermined value or when the inflow exhaust temperature corresponding to the maximum value of the grade is more than a predetermined value.

According to the result of the test studies by the present inventors, it is found out that as the catalyst is degraded, the maximum value of the grade is the smaller, and the inflow exhaust temperature corresponding to the maximum value of the grade is the higher. According to the fourth aspect, it is possible to appropriately determine the degradation of the catalyst by taking advantage of such characteristic.

A fifth aspect of the present invention is characterized in that in any of the aspects 1 to 4, the temperature increasing degree comprises a temperature increasing rate which is a ratio of an actual temperature increasing amount of the outflow exhaust temperature and a predetermined target temperature increasing amount when the exhaust air-fuel ratio is changed to the rich side so as to increase the outflow exhaust temperature by the predetermined target temperature increasing amount.

A sixth aspect of the present invention is characterized in that in any of the aspects 1 to 5, the exhaust air-fuel ratio changing means includes a fuel adding valve for adding fuel to an exhaust passage.

A seventh aspect of the present invention is characterized in that in the second aspect, the predetermined relation between the maximum value of the grade and the inflow exhaust temperature corresponding to the maximum value is set in the form of a map or a function.

The present invention can achieve an excellent effect of being capable of carrying out an accurate degradation diagnosis of a catalyst.

BRIEF DESCRIPTION OF THE DRAWINGS

FIG. 6 is a diagram showing a relation between FIG. 6A and FIG. 6B;

FIG. 6A is a flow chart showing a detailed procedure of degradation diagnosis processing;

BEST MODE FOR CARRYING OUT THE INVENTION

Hereinafter, the best mode for carrying out the present invention will be explained with reference to the accompanying drawings.

Figure 1:
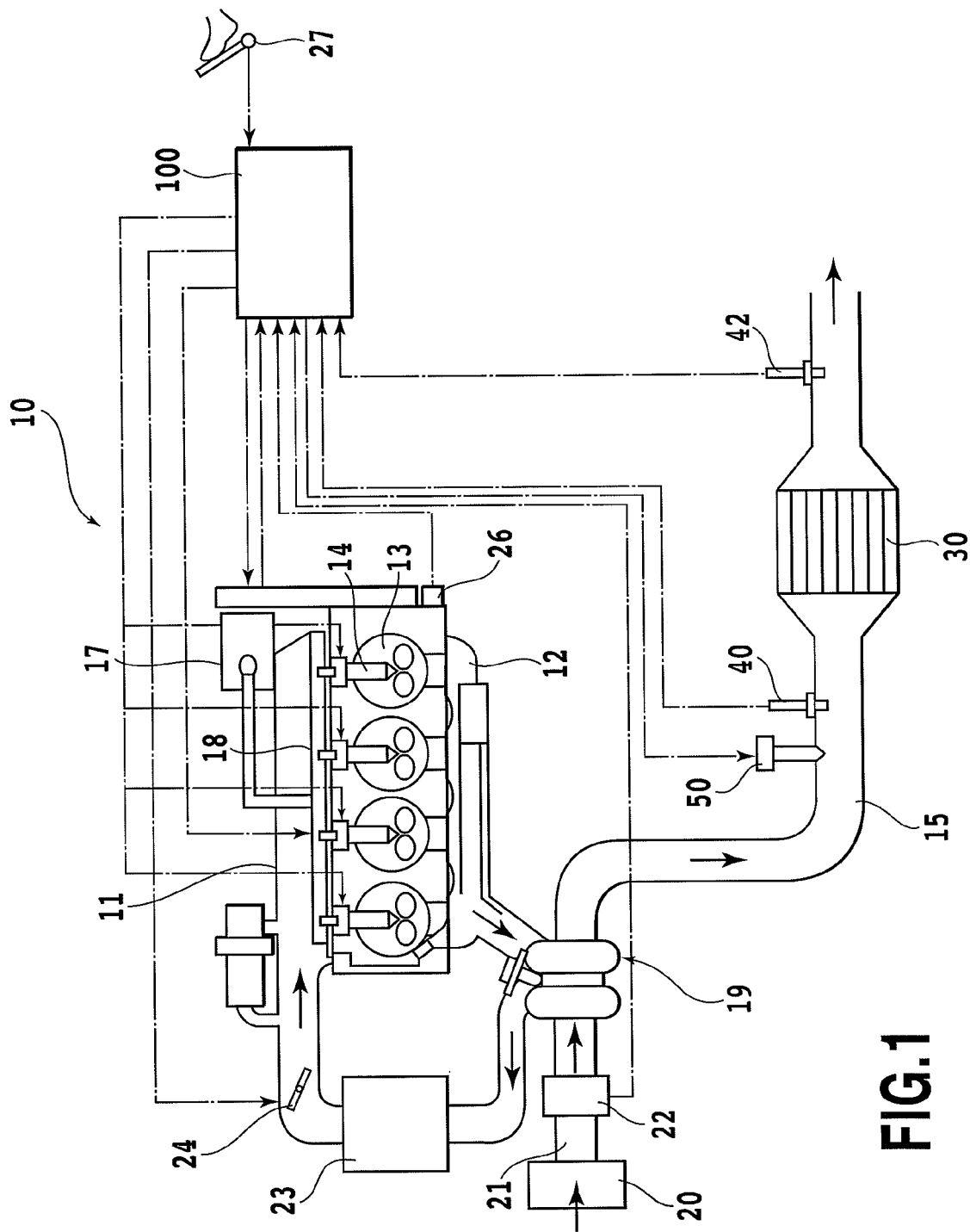
FIG. 1 is a system diagram schematically showing an internal combustion engine in an embodiment of the present invention.

FIG. 1 is a schematic system diagram of an internal combustion engine in an embodiment of the present invention. In the figure, numeral 10 denotes a compression ignition type internal combustion engine, i.e., a diesel engine, numeral 11 denotes an intake manifold communicated to an intake port, numeral 12 denotes an exhaust manifold communicated to an exhaust port and numeral 13 denotes a combustion chamber. In the present embodiment, fuel supplied to a high-pressure pump 17 from a fuel tank (not shown) is supplied under pressure to a common rail 18 by the high-pressure pump 17 and accumulated therein in a high-pressure state, and the high-pressure fuel in the common rail 18 is directly injected and supplied into the combustion chamber 13 from an injector (a fuel injection valve) 14. An exhaust gas from the engine 10 flows from the exhaust manifold 12 to a turbocharger 19 and thereafter, flows into an exhaust passage 15 downstream thereof. Further, the exhaust gas is subject to the purification treatment as described later, which is thereafter discharged into the air. It should be noted that the present invention may be applied to another type of internal combustion engine, for example, a spark ignition type of internal combustion engine. The form of the diesel engine is not limited to the engine equipped with the common rail type fuel injection device as shown in the present embodiment. Further, another device such as an EGR device may be arbitrarily included.

Intake air introduced from an air cleaner 20 into an intake passage 21 passes through an air flow meter 22, a turbocharger 19, an intercooler 23 and a throttle valve 24 in that order and flows to the intake manifold 11. The air flow meter 22 serves as a sensor for detecting an intake air quantity, more specially outputs a signal in accordance with a flow quantity of intake air. An electronically controlled valve is adopted as the throttle valve 24.

A catalyst 30 is located in the exhaust passage 15 at the downstream side from the turbocharger 19. The catalyst 30 in the present embodiment is an oxidation catalyst for oxidizing and purifying hydro carbon (HC) and carbon monoxide (CO) (particularly hydrocarbon) which are unburned components in the exhaust gas. However, the catalyst in the present invention is not limited to the oxidation catalyst, but may include any catalyst a temperature of which increases due to a reaction heat when the exhaust air-fuel ratio is changed to a rich side. Typically, the catalyst includes a catalyst where noble metals as an active kind are arranged dispersedly in the coat material. For example, the catalyst may be a three-way catalyst or a NOx catalyst (including a catalyst united with DPF). It is preferable to locate a NOx catalyst downstream of the catalyst 30 in addition thereto.

An electronic control unit (hereinafter, referred to as ECU) 100 is provided as control means for performing control of an entire engine. ECU 100 includes a CPU, a ROM, a RAM, input/output ports, and a memory device. The flow charts represented in FIGS. 5-8 represent an executable programmed logic for the ECU 100 to perform control. ECU 100 controls the injector 14, the high-pressure pump 17, the throttle valve 24 and the like so that a desired engine control is performed based upon detection values of various sensors or the like. A group of sensors connected to ECU 100 include the aforementioned air flow meter 22, further, a crank angle sensor 26 for detecting a crank angle of the engine 10, and an accelerator opening sensor 27 for detecting an accelerator opening. ECU 100 calculates a rotational speed of the engine 10 based upon output of the crank angle sensor 26.

As a group of sensors connected to ECU 100, exhaust temperature sensors 40 and 42 are provided before and after the catalyst 30. The exhaust temperature sensor 40 before the catalyst 30 is a sensor for detecting a temperature of an exhaust gas flowing into the catalyst 30 (inflow exhaust temperature) and hereinafter is referred to as "inflow exhaust temperature sensor". In addition, the exhaust temperature sensor 42 after the catalyst 30 is a sensor for detecting a temperature of an exhaust gas flowing out from the catalyst 30 (outflow exhaust temperature) and hereinafter is referred to as "outflow exhaust temperature sensor". It should be noted that by omitting the inflow exhaust temperature sensor 40, ECU 100 may instead estimate an inflow exhaust temperature based upon an engine operating condition. For example, it is possible to in advance store a relation between an engine rotational speed, and an accelerator opening and an inflow exhaust temperature in the form of a map or a function in ECU 100 for estimating an inflow exhaust temperature from actual detection values of the engine rotational speed and the accelerator opening by ECU 100.

Further, for changing the exhaust air-fuel ratio to the rich side, a fuel adding valve 50 is provided in the exhaust passage 15 upstream of the catalyst 30. When the fuel adding valve 50 is turned on by ECU 100, the fuel adding valve 50 opens to add and inject fuel into the exhaust passage 15. It should be noted that, other than the method of thus separately adding the fuel from the fuel adding valve 50, there may be a method of performing a post-injection of injecting the fuel from the injector 14 into the combustion chamber 13 during a latter stage of an expansion stroke or during an exhaust stroke. Since such addition of the additional fuel aims at changing the exhaust air-fuel ratio to the rich side to increase a reaction heat of the catalyst, thereby increasing a catalyst temperature, finally an outflow exhaust temperature, it is hereinafter called "temperature increasing addition". In a case of the diesel engine as in the present embodiment, the exhaust air-fuel ratio is basically much leaner (A/F=the order of 20 to 27) than a theoretical air-fuel ratio (stoichiometric air-fuel ratio, for example, A/F=14.6). In addition, by the temperature increasing addition, the exhaust air-fuel ratio is usually changed to the theoretical air-fuel ratio or a richer side than it. However, the exhaust air-fuel ratio is not necessarily the above, and may be maintained to an air-fuel ratio leaner than the theoretical air-fuel ratio, while changing the air-fuel ratio itself to a richer side.

Next, the degradation diagnosis of the catalyst 30 will be explained.

As explained above, in a case where an exhaust air-fuel ratio is changed to a rich side to diagnose the degradation of the catalyst based upon a catalyst temperature or a temperature increasing degree of an outflow exhaust temperature, the degradation diagnosis should be carried out in consideration of the inflow exhaust temperature, since the temperature increasing degree is also affected by the inflow exhaust temperature. Therefore, in the present embodiment, the catalyst degradation diagnosis is carried out as follows.

Figure 2:
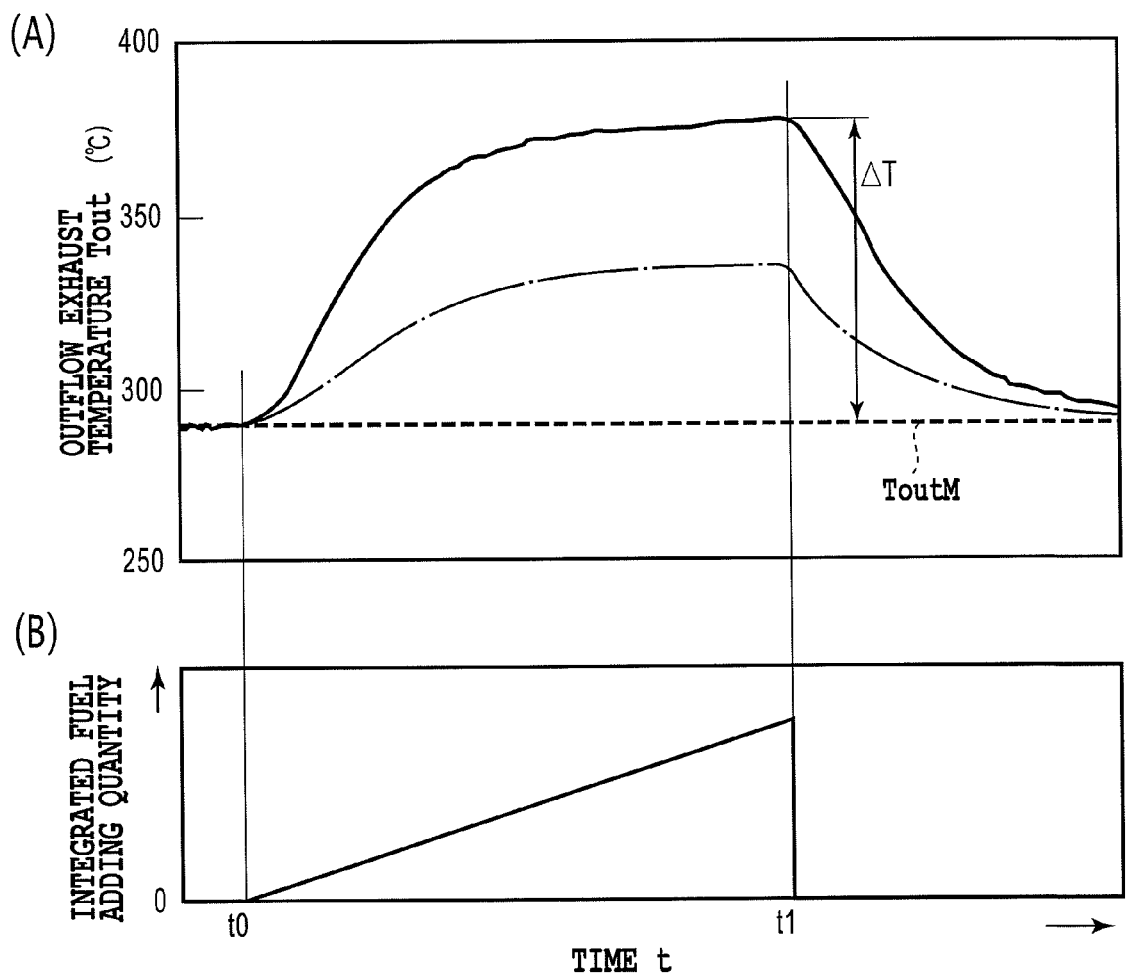
FIG. 2 is a time chart showing a state of an increase in an outflow exhaust temperature after starting with fuel addition.

First, the temperature increasing degree with respect to the outflow exhaust temperature is found when the exhaust air-fuel ratio is changed to the rich side. That is, as shown in FIG. 2, when the fuel addition is started by the fuel adding valve 50 (t=0), the outflow exhaust temperature Tout increases in response to it. A solid line in (A) shows a case of a normal catalyst and a dashed line shows a case of a degraded catalyst. As seen from the graph, a temperature increasing amount of the outflow exhaust temperature in the normal catalyst is larger than that of the degraded catalyst. In the present embodiment, the fuel is added so as to increase the outflow exhaust temperature by a predetermined target temperature increasing amount Ttrg (for example, 200° C.) in the case of a new catalyst. The fuel is added in a given rate per unit time until it comes to a predetermined maximum adding quantity at longest. (B) shows an integrated value of fuel quantities added from the fuel adding valve 50, that is, an integrated fuel adding quantity, which increases at a constant speed. As the fuel is added, the outflow exhaust temperature converges into a constant value over time. The temperature increasing amount at a converging point (t=t1) is defined as a final temperature increasing amount $\Delta T$.

A temperature increasing rate R ($=\Delta T/Ttrg \times 100(\%)$) which is a ratio of the temperature increasing amount $\Delta T$ and the target temperature increasing amount Ttrg is found. The temperature increasing rate R is a value representing a temperature increasing degree in regard to the outflow exhaust temperature when the exhaust air-fuel ratio is changed to the rich side.

Incidentally, the temperature increasing rate R has a tendency of becoming a smaller value as the catalyst is degraded and also as the outflow exhaust temperature is lower. Because, as the inflow exhaust temperature is lower, the catalyst active degree is lower and the reaction heat becomes smaller. This tendency occurs in a temperature region from a temperature at which activation of the catalyst starts (light off temperature) until the activation of the catalyst is completed.

Figure 3:
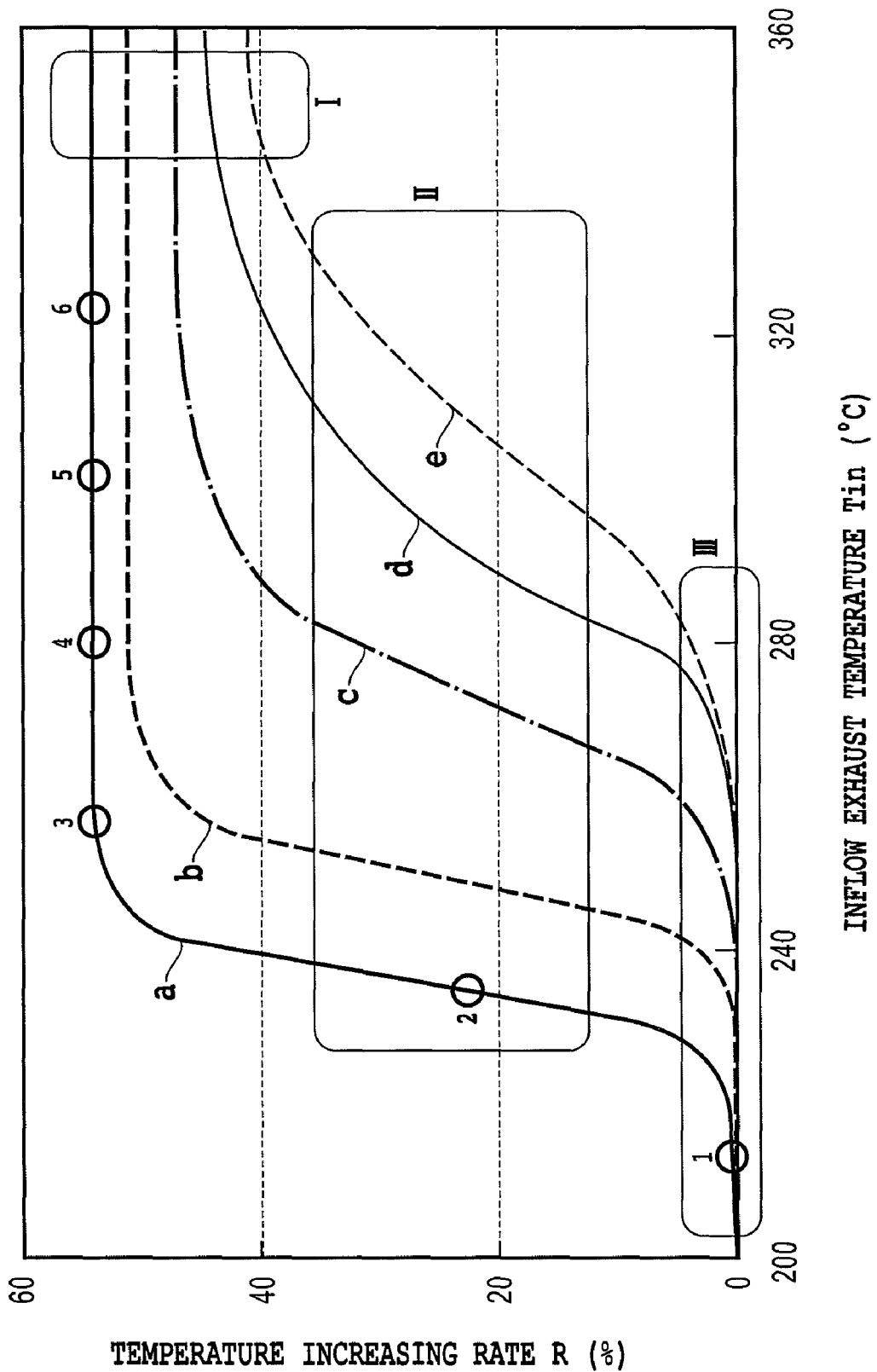
FIG. 3 is a graph showing a change of a temperature increasing rate at the time of changing an inflow exhaust temperature.

FIG. 3 shows a change of a temperature increasing rate R in a case of changing an inflow exhaust temperature Tin. Lines a to e show cases of different catalysts, the degradation degrees of which respectively increase in that order. As seen from the graph, the temperature increasing rate R of each catalyst has a tendency of becoming higher with an increase of the inflow exhaust temperature Tin. This is because as the inflow exhaust temperature Tin increases, the catalyst temperature increases to increase a catalyst reaction. In addition, the temperature increasing rate R begins to increase from the inflow exhaust temperature at which activation of the catalyst starts (R>0). As the inflow exhaust temperature becomes higher, the temperature increasing rate R gradually increases, and in a region of a temperature higher than the inflow exhaust temperature where the activation of the catalyst is completed, the temperature increasing rate R is constant as an upper limit value in accordance with the catalyst degradation degree. From the result illustrated, it is found out that the following characteristics occur simultaneously.

(1) As the catalyst is degraded, the catalyst reaction is lower, and therefore the upper limit value of the temperature increasing rate R is lower (refer to Region I)

(2) As the catalyst is degraded, the grade at the time the temperature increasing rate R increases, that is, the temperature increasing rate grade S is gradual (refer to Region II).

(3) As the catalyst is degraded, an activation start temperature of the catalyst is shifted to the higher temperature side. Therefore, an increase start point of the temperature increasing rate R is also shifted to the higher temperature side (refer to Region III).

Therefore, here, the degradation diagnosis is carried out by paying attention to the characteristic of (2). An increasing curve of the temperature increasing rate R is formed in a generally S-shape. The temperature increasing rate grade S at the time the temperature increasing rate R increases is at first, small, becomes large in the midway, and becomes again small. Consequently, the maximum value or the peak value exists in the temperature increasing rate grade S.

Figure 4:
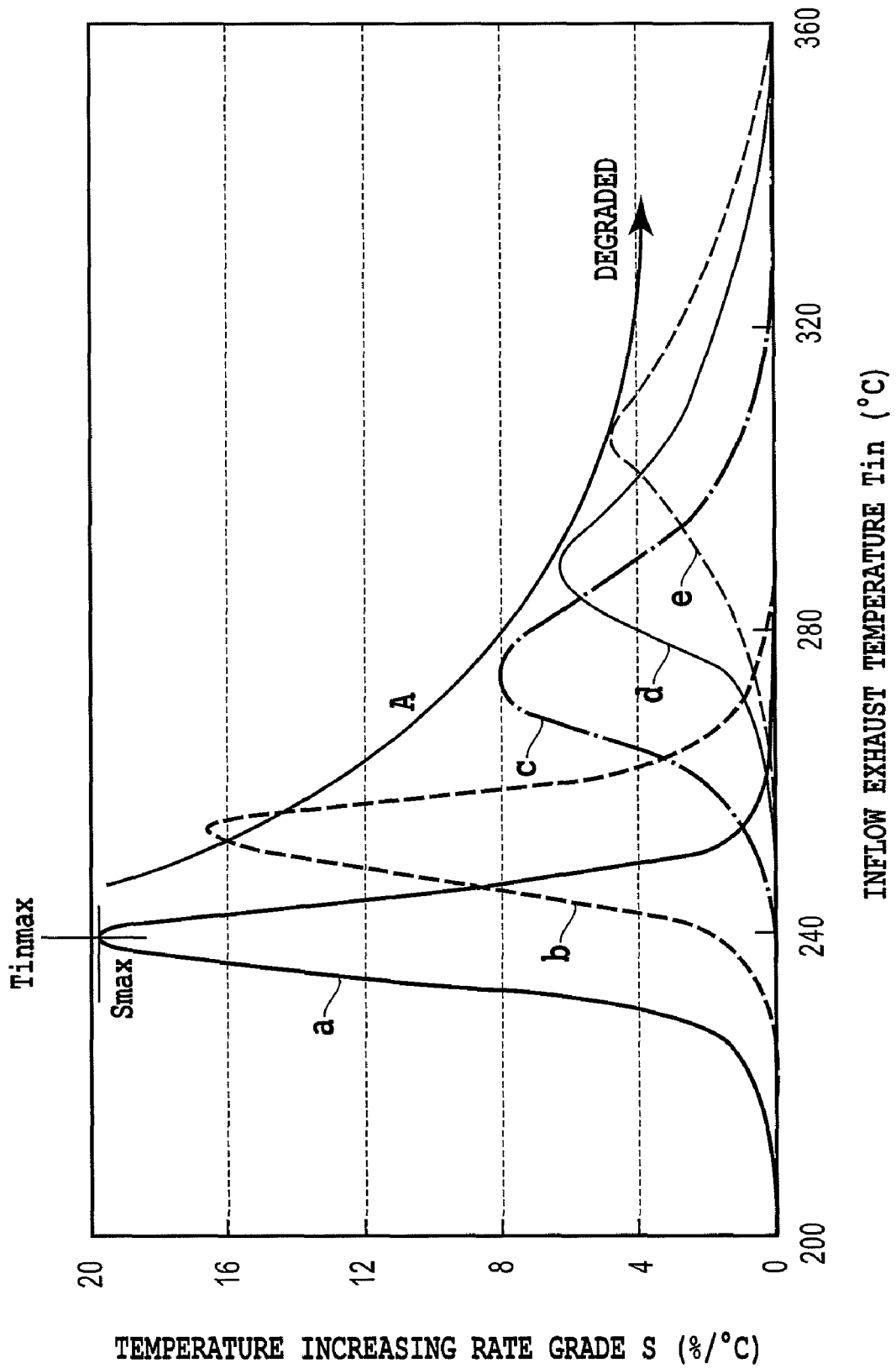
FIG. 4 is a graph showing a relation between an inflow increasing temperature and a temperature increasing rate grade.

FIG. 4 shows a relation between an inflow exhaust temperature Tin and a temperature increasing rate grade S based upon the result in FIG. 3. Lines a to e in FIG. 4 correspond to lines a to e in FIG. 3. As seen from FIG. 4, in regard to each catalyst, this relation has a mountain-shaped configuration in which when the inflow exhaust temperature increases, the temperature increasing rate grade S starts to increase and thereafter, goes down. Then, the temperature increasing rate grade S reaches the maximum value or the peak value Smax in the midway. From the result illustrated, it is found out that the following characteristics occur simultaneously.

(4) As the catalyst is degraded, the maximum value Smax of the temperature increasing rate grade S is lower.

(5) As the catalyst is degraded, the inflow exhaust temperature Tinmax corresponding to the maximum value Smax of the temperature increasing rate grade S (or providing the maximum value Smax) is higher. It should be noted that the characteristics of (4) and (5) are combined to be shown in an arrow A in the figure.

(6) As the catalyst is degraded, a temperature range in which the temperature increasing rate grade S is larger than zero is widened (that is, the skirt of the mountain-shaped configuration is widened).

Therefore, here the degradation diagnosis is carried out by using at least one of the characteristics in (4) and (5). That is, according to the characteristic in (4), when the maximum value Smax of the temperature increasing rate grade S is equal to or less than a predetermined value (for example, 7 (%/° C.)), the catalyst can be determined to be degraded. In addition, according to the characteristic in (5), when the inflow exhaust temperature Tinmax corresponding to the maximum value Smax of the temperature increasing rate grade S is equal to or more than a predetermined value (for example, 280° C.), the catalyst can be determined to be degraded. Thus, by carrying out the degradation diagnosis based upon not only the temperature increasing degree in regard to the outflow exhaust temperature at the time of changing the exhaust air-fuel ratio to the rich side but also the inflow exhaust temperature at that time, the degradation diagnosis can be carried out more accurately to increase the diagnosis accuracy.

Figure 8:
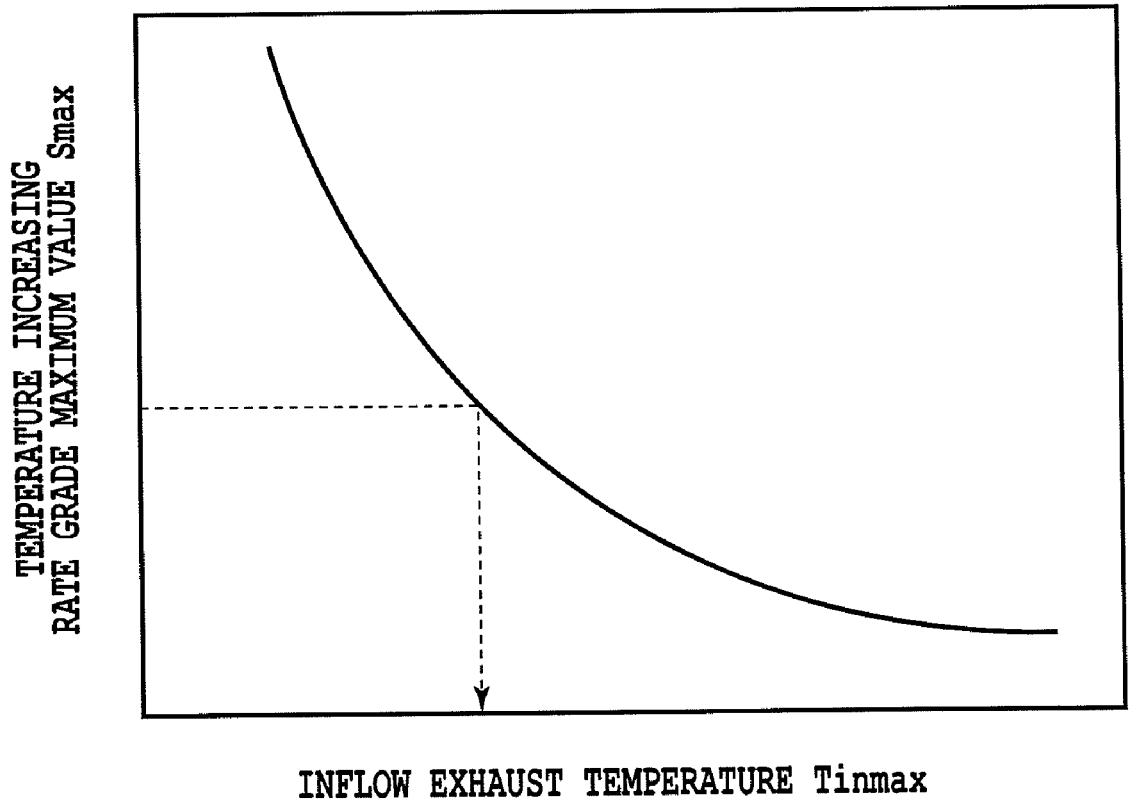
FIG. 8 is a map in advance defining a relation between a maximum value of a temperature increasing rate grade and an inflow exhaust temperature corresponding to the maximum value.

According to the result in FIG. 4, there is a relation of one to one as shown in an arrow A between the maximum value Smax of the temperature increasing rate grade S and the inflow exhaust temperature Tinmax corresponding thereto. With respect to the maximum value Smax of a temperature increasing rate grade S, the only inflow exhaust temperature Tinmax is defined. Accordingly, a relation between the maximum value Smax of the temperature increasing rate grade S and the inflow exhaust temperature Tinmax is in advance defined through experiments or the like as shown in FIG. 8 and is stored, so that a true value, that is, a reference value of the inflow exhaust temperature corresponding to the actually obtained maximum value Smax of the temperature increasing rate grade S can be found therefrom. A comparison with this reference value allows for detecting a deviation or an abnormality of the actually detected inflow exhaust temperature, and further an abnormality of the inflow exhaust temperature sensor 40.

Further, by determining the degradation of the catalyst after correcting the actually detected inflow exhaust temperature Tinmax, the degradation diagnosis can be carried out more accurately. Particularly, in a temperature region from an activation start of the catalyst to an activation completion thereof, a deviation of a detection value in the inflow exhaust temperature has a great impact on the temperature increasing rate R, the temperature increasing rate grade S and the maximum value Smax of the temperature increasing rate grade S. Therefore, such correction is very effective.

It should be noted that in a case of using an estimation value as the inflow exhaust temperature Tin, it is possible to detect a deviation and an abnormality of the estimation value, and correct so as to make the deviation zero.

Hereinafter, the degradation diagnosis processing in the present embodiment carried out by ECU 100 will be explained. First, a rough procedure of the degradation diagnosis processing will be explained with reference to FIG. 5.

At first step S10, a temperature increasing rate R is measured in regard to each of different, plural inflow exhaust temperatures Tin. At next step S12, a temperature increasing rate grade S is calculated in regard to each of the inflow exhaust temperatures Tin. At step S14, the maximum value Smax is determined among the temperature increasing rate grades S and at the same time, the inflow exhaust temperature Tinmax corresponding to the maximum value Smax of the temperature increasing rate grade is determined. At step S16, it is determined whether or not the determined inflow exhaust temperature Tinmax is abnormal. When the determined inflow exhaust temperature Tinmax is abnormal, this value is corrected. At step S18, it is determined whether or not the catalyst is degraded based upon both of the maximum value Smax of the temperature increasing rate grade and the inflow exhaust temperature Tinmax corresponding thereto. It should be noted that in the present embodiment, the degradation determination is made based upon both of the maximum value Smax of the temperature increasing rate grade and the inflow exhaust temperature Tinmax corresponding thereto, but the degradation determination may be made based upon at least one of them, that is, based upon either the maximum value Smax of the temperature increasing rate grade or the inflow exhaust temperature Tinmax.

Figure 6B:
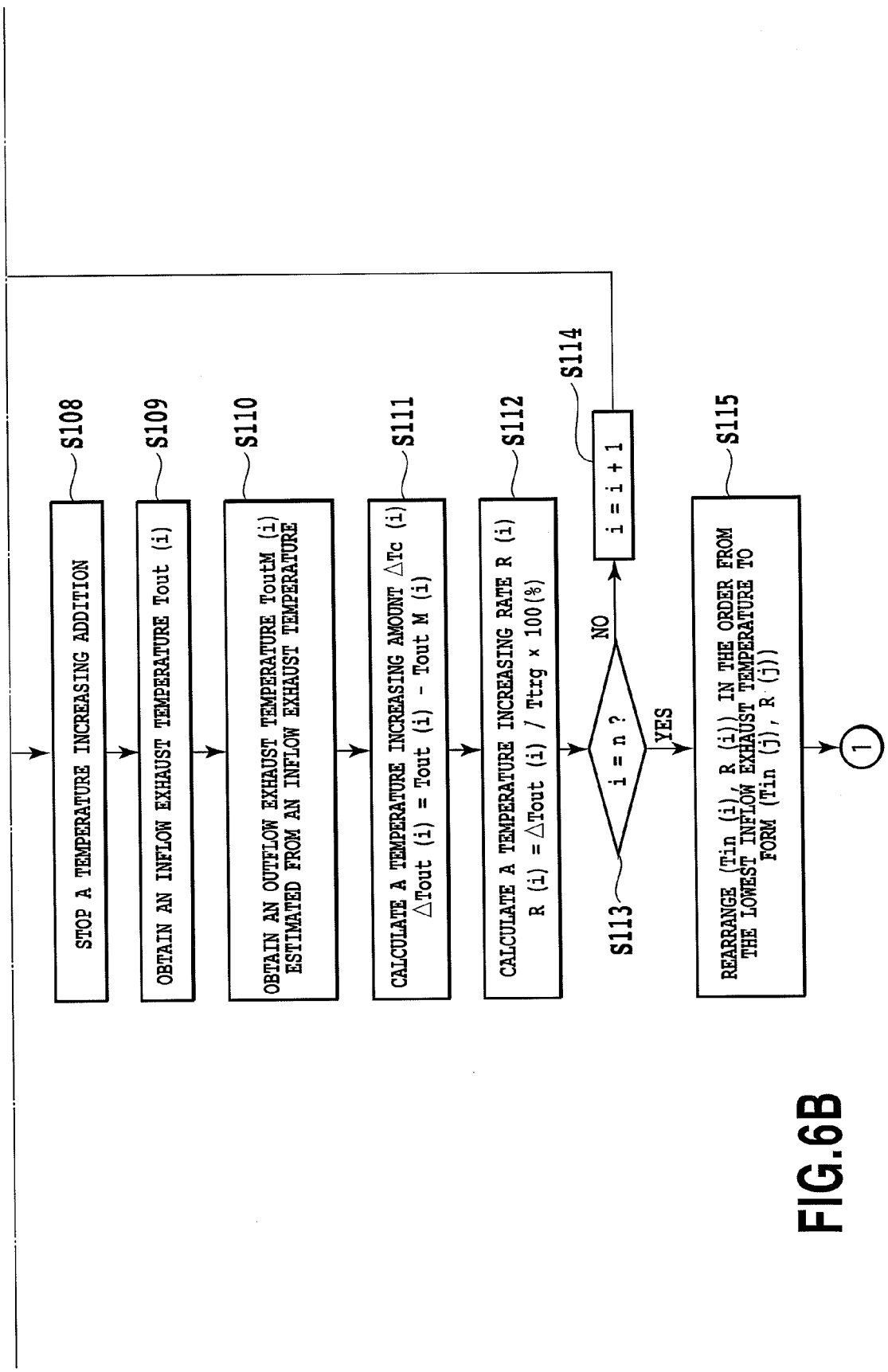
FIG. 6B is a flow chart showing a detailed procedure of degradation diagnosis processing.

Next, a detailed procedure of the degradation diagnosis processing will be explained with reference to FIG. 6A, FIG. 6B and FIG. 7. It should be noted that the degradation diagnosis processing is carried out in each predetermined calculation period by ECU 100, but in regard to a flow chart shown, the entirety is not completed in each calculation period and the flow chart shows the procedure only.

First, at step S101, it is determined whether or not a predetermined prerequisite necessary for starting with degradation diagnosis processing is established. The prerequisite means a condition where an actual inflow exhaust temperature Tin detected by the inflow exhaust temperature sensor 40 is equal to or more than a predetermined temperature (for example, 200° C.) at which a new catalyst starts with activation. Further, it is preferable to add the event that an engine operating condition is steady to such prerequisite. For example, when each detection value of an engine rotational speed and an accelerator opening is substantially constant, it is determined that the engine operating condition is steady. Further, in a case of being provided with means for controlling an inflow exhaust temperature, it is preferable to add the event that the controlled inflow exhaust temperature is substantially constant to such prerequisite.

In a case where the prerequisite is not established, step S101 is repeatedly executed until it is established. When the prerequisite is established, at step S102, i is set equal to 1.

Next, at step S103, the actual inflow exhaust temperature Tin detected by the inflow exhaust temperature sensor 40 is obtained. At step S104, it is determined whether or not a temperature increasing rate R corresponding to the obtained inflow exhaust temperature Tin is already measured. That is, in the degradation diagnosis processing of the present embodiment, data of the inflow exhaust temperature Tin and the temperature increasing rate R are used as a set, and the data set is found with respect to different, plural inflow exhaust temperatures Tin. Therefore, it is not necessary to measure again the temperature increasing rate R with respect to the inflow exhaust temperature Tin to which the temperature increasing rate R is already measured. At this step, it is determined from this respect whether or not the inflow exhaust temperature Tin is the one to which the temperature increasing rate R is already measured. It should be noted that the present embodiment is, for convenience, designed to measure the temperature increasing rate R at each point unit of the inflow exhaust temperature Tin, but instead of this, the entire inflow exhaust temperature may be divided into a plurality of regions each having a predetermined temperature width to measure the temperature increasing rate R at each region unit. In this case, the temperature increasing rate R measured to an inflow exhaust temperature Tin results in the temperature increasing rate R measured to the divided region containing the inflow exhaust temperature Tin. Consequently, the temperature increasing rate R is supposed to be measured in the different, plural divided regions individually.

At step S104, when it is determined that the temperature increasing rate is already measured, steps S103 and S104 are repeatedly executed. When it is determined that the temperature increasing rate is not yet measured, the measurement of the temperature increasing rate is substantially started. First, at step S105, the inflow exhaust temperature obtained at step S103 is set as Tin (i).

At next step S106, the fuel adding valve 50 is turned on (opens), and the temperature increasing addition is started and carried out. At this time, as described above, fuel is added so that an outflow exhaust temperature increases by a predetermined target temperature increasing amount Ttrg (for example, 200° C.) in a case of a new catalyst. The fuel continues to be added in a constant rate per unit time.

During the temperature increasing addition, an actual outflow exhaust temperature Tout detected by the outflow exhaust temperature sensor 42 is monitored all the time. At step S107, presence/absence of a change or a temperature increase of the outflow exhaust temperature Tout is determined. For example, ECU 100 calculates a differential value of the outflow exhaust temperature Tout in each predetermined calculation period. When the differential value is less than a predetermined value, for example, the differential value is equal to or less than 0.3° C./sec as a temperature changing speed, it is determined that the outflow exhaust temperature Tout does not change. In the duration where the outflow exhaust temperature Tout is changing, step S107 is repeatedly executed. When the change of the outflow exhaust temperature Tout stops, the process goes to step S108, wherein the fuel adding valve 50 is turned off (is closed), and the temperature increasing addition stops and is completed.

In a case where the catalyst is degraded, even if a fuel quantity is added to the extent that a new catalyst increases in temperature by a target temperature increasing amount Ttrg in the temperature increasing addition, the temperature increase stops and reaches an upper limit value before the addition of the fuel quantity is completed. Therefore, for avoiding the subsequent wasteful temperature increasing addition, that is, the wasteful fuel consumption, presence/absence of the temperature increase is determined, and the temperature increasing addition stops at a point where the temperature increase disappears.

Next, at step S109, an actual outflow exhaust temperature at a point of the temperature increasing addition completion is obtained as Tout (i). At the same time, at step S110, an outflow exhaust temperature is estimated from the actual inflow exhaust temperature detected from the inflow exhaust temperature sensor 40 at this point and this estimation value is obtained as ToutM (i). Thereafter, at step S111, a temperature increasing amount $\Delta T$ after the temperature increasing addition at this time is calculated according to the expression: $\Delta T$ (i)=Tout (i)−ToutM (i). At step S112, a temperature increasing rate R (i) after the temperature increasing addition at this time, is calculated according to the expression: R (i)=$\Delta T$ (i)/Ttrg×100(%).

In the present embodiment, for calculating the temperature increasing amount $\Delta T$, a difference between the actual outflow exhaust temperature Tout at a point of the temperature increasing addition completion and the estimation outflow exhaust temperature ToutM is defined as the temperature increasing amount $\Delta T$. The reason for using the estimation outflow exhaust temperature ToutM is to obtain an outflow exhaust temperature in a case assuming that the temperature increasing addition is not made and also that there is the possibility that such outflow exhaust temperature slightly changes during the temperature increasing addition. In regard to a method of calculating the estimation outflow exhaust temperature ToutM, a relation between an inflow exhaust temperature Tin and an outflow exhaust temperature Tout is in advance set and stored in the form of a map or a function through experiments or the like and the estimation outflow exhaust temperature ToutM is calculated from a detection value of an actual inflow exhaust temperature using this map or the like. It should be noted that examples of the method of calculating the temperature increasing amount $\Delta T$ may include other various methods. For example, instead of the estimation outflow exhaust temperature ToutM, the outflow exhaust temperature Tout detected by the outflow exhaust temperature sensor 42 at a start point of the temperature increasing addition may be used, or the inflow exhaust temperature Tin detected by the inflow exhaust temperature sensor 40 at a completion point of the temperature increasing addition may be used.

Thereafter, at step S113, it is determined whether or not i is equal to 1. n is a predetermined value showing the obtaining number of the data set (Tin (i), R (i)) and in the present embodiment, n=6 for convenience. It should be noted that when the number of the data set is as many as possible, it is more advantageous in terms of an improvement of diagnosis accuracy, but since more time is required for obtaining the data, it is preferable to set an optimal value in consideration of balance. There is a case where a plurality of trips are required to obtain the n pieces of the data sets. It should be noted that one trip means one cycle from engine start to engine stop.

When i is smaller than n, at step S114, i is set to be equal to i+1, that is, the number of i is increased by 1 and thereafter, steps S103 to S1013 are repeatedly executed. When i reaches n, the process goes to step S115. At this point, six pieces of the data sets (Tin (1), R (1) to Tin (6), R (6)) are supposed to be obtained with respect to different inflow exhaust temperatures (refer to white circles 1 to 6 in FIG. 3).

Next, these data sets (Tin (i), R (i)) are rearranged in the order of the low inflow exhaust temperature to form (Tin (j), R (j)). That is, in previous steps S103 to S112, the data sets are obtained at random with respect to the inflow exhaust temperature, that is, in order with priority of data in which the temperature increasing rate is not measured. For example, by comparing the data set of (Tin (1), R (1)) with the data set of (Tin (2), R (2)), the inflow exhaust temperature of (Tin (1)) is possibly higher than the inflow exhaust temperature of (Tin (2)). Here, for convenience, the previous data set of (Tin (i), R (i)) is rearranged in the order of the low inflow exhaust temperature. Consequently, for example, the data set of (Tin (1), R (1)) is replaced by the data set of (Tin (2), R (2)), and the data set of (Tin (2), R (2)) is replaced by the data set of (Tin (1), R (1)).

Figure 7:
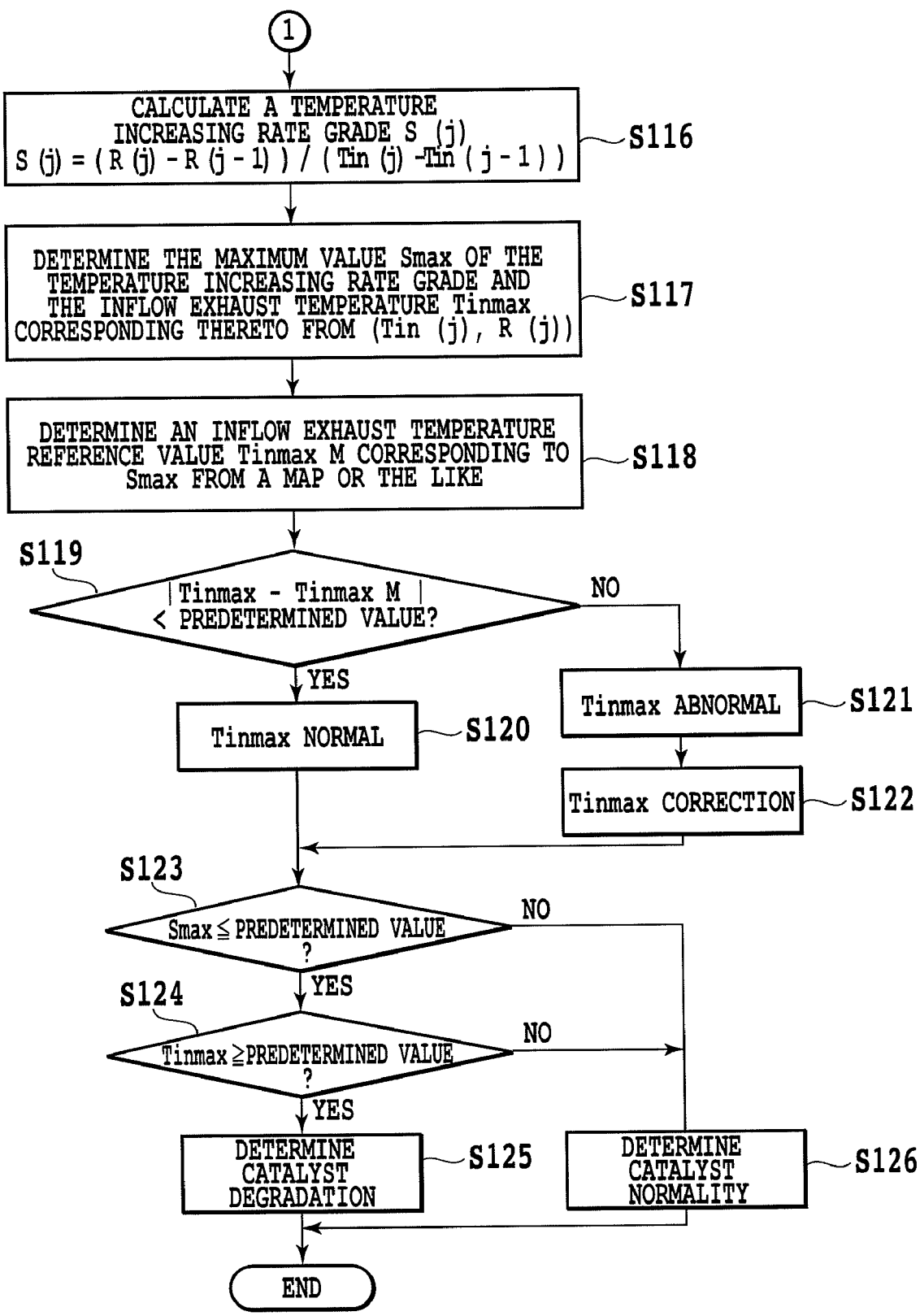
FIG. 7 is a flow chart showing a detailed procedure of degradation diagnosis processing.

When the rearrangement of the data sets are thus completed, at step S116 shown in FIG. 7 a temperature increasing rate grade S (j) (a grade of the temperature increasing degree) is calculated according to the following expression by using the data set of (Tin (j), R (j)).

$$S(j)=(R(j)-R(j-1))/(Tin(j)-Tin(j-1))$$

Where, j=1 . . . n, and S (1)=0. Consequently, n pieces of temperature increasing rate grades of S (1) to S (n) are to be calculated.

The inflow exhaust temperatures of Tin (1) to Tin (n) are associated respectively with n pieces of the temperature increasing rate grades of S (1) to S (n). Consequently, n pieces of the data sets of (Tin (1), S (1))-(Tin (n), S (n))) are completed.

Next, at step S117, one data set in which the temperature increasing rate grade S is the maximum is selected from the data sets of (Tin (j), S (j)), and the temperature increasing rate grade of the one data set is determined as the maximum value Smax of the temperature increasing rate grade. Further, the inflow exhaust temperature of the one data set is determined as the inflow exhaust temperature Tinmax corresponding to the maximum value Smax of the temperature increasing rate grade.

Thereafter, the process goes to step S118, wherein a reference value of the inflow exhaust temperature TinmaxM corresponding to the maximum value Smax, of the temperature increasing rate grade is determined from a map (or function) as shown in FIG. 8 for example.

At step S119, the inflow exhaust temperature Tinmax as the actual detection value is compared with the reference value of the inflow exhaust temperature TinmaxM as a map value. More specifically, an absolute value of a difference of both (Tinmax−TinmaxM) is compared with a predetermined value (for example, 20° C.). When the difference is less than the predetermined value, at step S120 it is determined that the detection value Tinmax is normal. That is, it is determined that no deviation of the detection value is generated and the inflow exhaust temperature sensor 40 is normal.

On the other hand, when the difference is equal to or more than the predetermined value, at step S121 it is determined that the detection value Tinmax is abnormal. That is, it is determined that the detection value is out of a normal value and the inflow exhaust temperature sensor 40 is abnormal. At step S122, the correction is made for compensating for this deviation amount. More specifically, the correction of making the actual value equal to the reference value is made by subtracting the difference between the actual value and the reference value (Tinmax−TinmaxM) from the actual value. It should be noted that the other correction method, such as a method of multiplying the actual value by a correction coefficient in accordance with the difference, may be adopted. In this way, when the actual detection value of the inflow exhaust temperature is abnormal, the correction is made and the subsequent degradation diagnosis processing is carried out. Therefore, it is possible to improve the diagnosis accuracy.

Next, at step S123, the maximum value Smax of the temperature increasing rate grade is compared with a predetermined value (for example, 7% based upon the result in FIG. 4). When the maximum value Smax of the temperature increasing rate grade is larger than the predetermined value, it is determined at step S126 that the catalyst is normal.

On the other hand, when the maximum value Smax of the temperature increasing rate grade is equal to or less than the predetermined value, the process goes to step S124, wherein the inflow exhaust temperature Tinmax corresponding to the maximum value Smax of the temperature increasing rate grade is compared with a predetermined value ((for example, 280° C. based upon the result in FIG. 4). When the inflow exhaust temperature Tinmax is less than the predetermined value, it is determined at step S126 that the catalyst is normal. On the other hand, when the inflow exhaust temperature Tinmax is equal to or more than the predetermined value, it is determined at step S125 that the catalyst is abnormal. As a result, the degradation diagnosis processing is completed.

Figure 5:
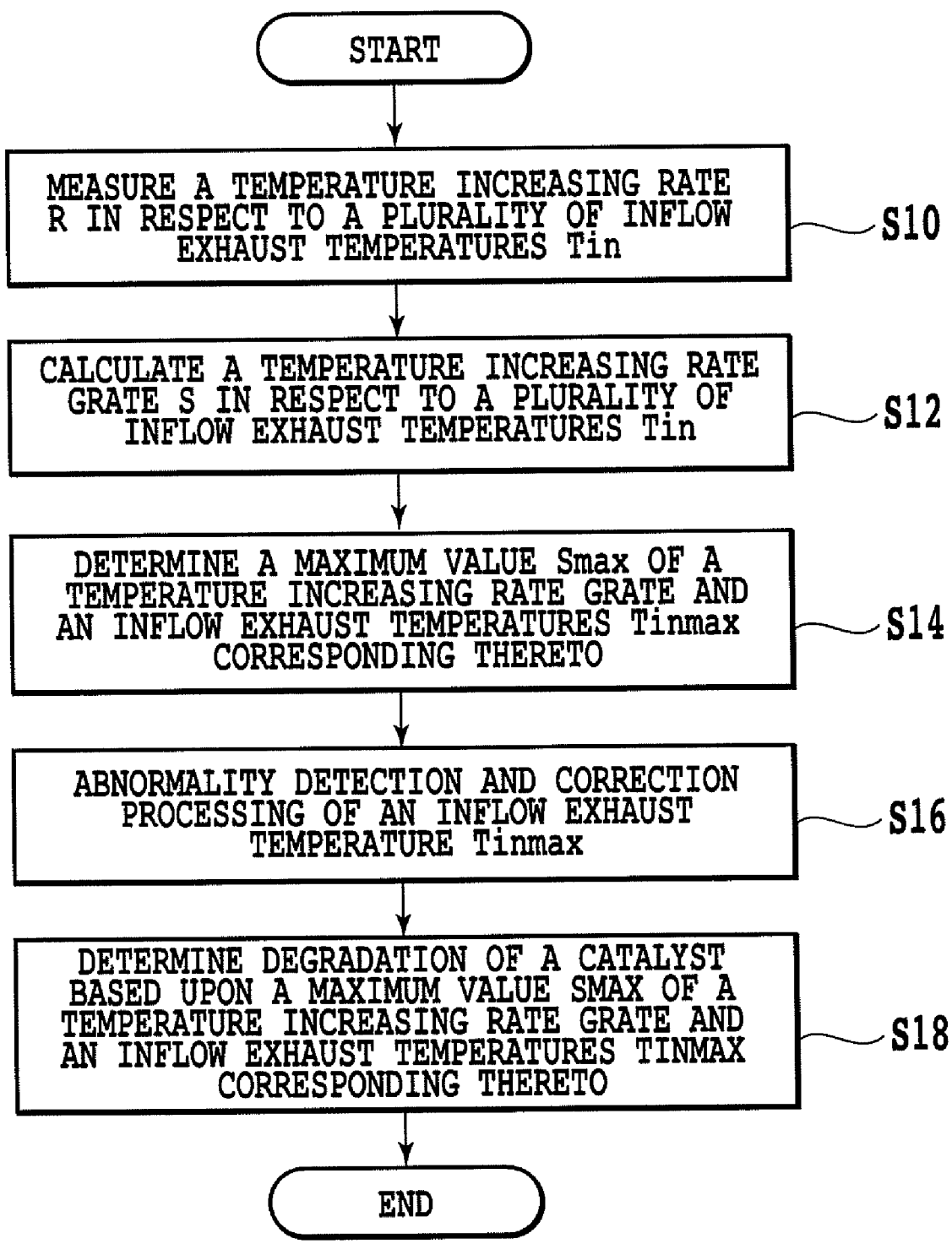
FIG. 5 is a flow chart showing a rough procedure of degradation diagnosis processing.

As seen from the above description, steps S103 to S114 correspond to step S10 in FIG. 5, steps S115 and S116 correspond to step S12 in FIG. 5, step S117 corresponds to step S14 in FIG. 5, steps S118 to S122 correspond to step S16 in FIG. 5, and steps S123 to S126 correspond to step S18 in FIG. 5.

As described above, the embodiment of the present invention is explained, but the present invention may adopt other embodiments. For example, the numerical values used in the above embodiment are simply exemplified and an arbitrary numerical value may be adopted depending on test results of actual products or the like. In addition, in the above embodiment, at steps S123 to S126 it is determined that the catalyst is degraded when Smax≦a predetermined value, and Tinmax≧a predetermined value, and it is determined that the catalyst is normal other than the above. In reverse, it may be determined that the catalyst is normal when Smax>a predetermined value, and Tinmax<a predetermined value, and it may be determined that the catalyst is degraded other than the above. Further, in the above embodiment, the inflow exhaust temperature at a start time of the temperature increasing addition is used as a value of the inflow exhaust temperature Tin (i) (step S105), but not limited thereto, for example, an average value of the inflow exhaust temperature during the temperature increasing addition may be used.

The embodiment of the present invention is not limited to the aforementioned embodiment and the present invention can include all modifications or applications and equivalents thereto included in the spirit of the present invention defined by the scope of claims. Accordingly, the present invention should not be interpreted in a limited way and can be applied to any other technology included within the scope of the spirit of the present invention.

INDUSTRIAL APPLICABILITY

The present invention is applicable to a catalyst provided in an exhaust passage for an internal combustion engine.

The invention claimed is:

1. A degradation diagnosis device for determining degradation of a catalyst comprising:
an outflow exhaust temperature sensor disposed downstream of the catalyst for detecting an outflow exhaust temperature of an exhaust gas flowing out of the catalyst; and
an electronic control unit configured, with executable programmed logic, to perform:
changing an exhaust air-fuel ratio of an internal combustion engine to a rich side;
estimating an inflow exhaust temperature which is a temperature of an exhaust gas flowing into a catalyst; and
determining degradation of the catalyst by finding a temperature increasing degree of the outflow exhaust temperature at the time the exhaust air-fuel ratio is changed to the rich side, in respect to each of a plurality of the inflow exhaust temperatures, and finding a grade of the temperature increasing degree based upon the inflow exhaust temperature and the temperature increasing degree to determine degradation of the catalyst based upon at least one of a maximum value of the grade and the inflow exhaust temperature corresponding to the maximum value.

2. The degradation diagnosis device for the catalyst according to claim 1, wherein the electronic control unit further performs calculating a reference value of the inflow exhaust temperature corresponding to the maximum value of the grade from a predetermined relation between the maximum value of the grade and the inflow exhaust temperature corresponding to the maximum value, and comparing the reference value with an estimation value of the inflow exhaust temperature corresponding to the maximum value of the grade to determine an abnormality of the estimation value.

3. The degradation diagnosis device for the catalyst according to claim 2,
wherein the electronic control unit further performs correcting an estimation value when the abnormality determining means determines that the estimation value is abnormal,
determining the degradation of the catalyst based upon at least one of the maximum value of the grade and the corrected estimation value of the inflow exhaust temperature corresponding to the maximum value.

4. The degradation diagnosis device for the catalyst according to claim 1,
wherein the electronic control unit further performs determining that the catalyst is degraded at least either when the maximum value of the grade is less than a predetermined value or when the inflow exhaust temperature corresponding to the maximum value of the grade is more than a predetermined value.

5. The degradation diagnosis device for the catalyst according to claim 1,
wherein the temperature increasing degree comprises a temperature increasing rate which is a ratio of an actual temperature increasing amount of the outflow exhaust temperature and a predetermined target temperature increasing amount when the exhaust air-fuel ratio is changed to the rich side so as to increase the outflow exhaust temperature by the predetermined target temperature increasing amount.

6. The degradation diagnosis device for the catalyst according to claim 1,
Wherein a fuel adding valve adds fuel to an exhaust passage to change the exhaust air-fuel ratio.

7. The degradation diagnosis device for the catalyst according to claim 2, wherein the predetermined relation between the maximum value of the grade and the inflow exhaust temperature corresponding to the maximum value is set in the form of a map or a function.

8. A degradation diagnosis device for determining degradation of a catalyst comprising:
an inflow exhaust temperature sensor disposed upstream of the catalyst for detecting an inflow exhaust temperature of an exhaust gas flowing into the catalyst;
an outflow exhaust temperature sensor disposed downstream of the catalyst for detecting an outflow exhaust temperature of an exhaust gas flowing out of the catalyst; and
electronic control unit configured, with executable programmed logic, to perform:

changing an exhaust air-fuel ratio of an internal combustion engine to a rich side;
determining degradation of the catalyst by finding a temperature increasing degree of the outflow exhaust temperature at the time the exhaust air-fuel ratio is changed to the rich side, in respect to each of a plurality of the inflow exhaust temperatures, and finding a grade of the temperature increasing degree based upon the inflow exhaust temperature and the temperature increasing degree to determine degradation of the catalyst based upon at least one of a maximum value of the grade and the inflow exhaust temperature corresponding to the maximum value.

9. The degradation diagnosis device for the catalyst according to claim 8, wherein the electronic control unit further performs calculating a reference value of the inflow exhaust temperature corresponding to the maximum value of the grade from a predetermined relation between the maximum value of the grade and the inflow exhaust temperature corresponding to the maximum value, and comparing the reference value with a detection value of the inflow exhaust temperature corresponding to the maximum value of the grade to determine an abnormality of the detection value.

10. The degradation diagnosis device for the catalyst according to claim 9, wherein the electronic control unit further performs correcting a detection value when the abnormality determining means determines the detected value is abnormal,
determining the degradation of the catalyst based upon at least one of the maximum value of the grade and the corrected detection value of the inflow exhaust temperature corresponding to the maximum value.

11. The degradation diagnosis device for the catalyst according to claim 8,
wherein the electronic control unit further performs determining that the catalyst is degraded at least either when the maximum value of the grade is less than a predetermined value or when the inflow exhaust temperature corresponding to the maximum value of the grade is more than a predetermined value.

12. The degradation diagnosis device for the catalyst according to claim 8,
wherein the temperature increasing degree comprises a temperature increasing rate which is a ratio of an actual temperature increasing amount of the outflow exhaust temperature and a predetermined target temperature increasing amount when the exhaust air-fuel ratio is changed to the rich side so as to increase the outflow exhaust temperature by the predetermined target temperature increasing amount.

13. The degradation diagnosis device for the catalyst according to claim 8,
wherein a fuel adding valve adds fuel to an exhaust passage to change the exhaust air-fuel ratio.

14. The degradation diagnosis device for the catalyst according to claim 9,
wherein the predetermined relation between the maximum value of the grade and the inflow exhaust temperature corresponding to the maximum value is set in the form of a map or a function.

* * * * *